(12) United States Patent
Cui

(10) Patent No.: US 8,464,570 B2
(45) Date of Patent: Jun. 18, 2013

(54) METHOD FOR MANUFACTURING S-SHAPED BENT EDGE ON HEAT-ISOLATING PROTECTION METAL COMPONENT

(76) Inventor: Xuejun Cui, Beijing (CN)

( * ) Notice: Subject to any disclaimer, the term of this patent is extended or adjusted under 35 U.S.C. 154(b) by 618 days.

(21) Appl. No.: 12/337,601

(22) Filed: Dec. 17, 2008

(65) Prior Publication Data

US 2010/0139358 A1 Jun. 10, 2010

(30) Foreign Application Priority Data

Dec. 5, 2008 (CN) .......................... 2008 1 0182424

(51) Int. Cl.
*B21D 11/10* (2006.01)
*B21D 22/00* (2006.01)

(52) U.S. Cl.
USPC ............. 72/379.2; 72/352; 72/356; 72/391.2; 413/8; 413/12

(58) Field of Classification Search
USPC ................... 72/321, 349, 350, 356, 331, 387, 72/391.1, 379.2, 381, 382, 352, 391.2; 413/8, 413/12, 13
See application file for complete search history.

(56) References Cited

U.S. PATENT DOCUMENTS

| | | | | | |
|---|---|---|---|---|---|
| 3,846,888 | A | * | 11/1974 | Chaffee et al. | 72/356 |
| 4,392,373 | A | * | 7/1983 | Clark | 72/321 |
| 5,823,730 | A | * | 10/1998 | La Rovere | 72/348 |
| 7,350,392 | B2 | * | 4/2008 | Turner et al. | 72/379.4 |

* cited by examiner

*Primary Examiner* — David B Jones

(57) ABSTRACT

A method of making an S-shaped bent edge component comprising: placing in order an upper layer of metal base plate and a lower layer of metal base plate as well as a middle layer of heat-isolating materials in between; fixing the metal base plates with the heat-isolating materials; forming J-shaped edges on the base plates by stamping, and the J-shaped edges of the base plates are perpendicular to a horizontal portion of the metal base plates; each of the J-shaped edges of the base plates has an outwardly bent curve with a crown and a curve end; by means of a stamping step performed by an upper mold M1 with a concave surface and a flat surface and a lower mold M2 with a flat surface, the concave surface of the mold M1 exerts lateral force onto the curve ends so that the J-shaped edges of the base plates inwardly bend towards the upper metal base plate.

2 Claims, 2 Drawing Sheets

US 8,464,570 B2

METHOD FOR MANUFACTURING S-SHAPED BENT EDGE ON HEAT-ISOLATING PROTECTION METAL COMPONENT

BACKGROUND OF THE INVENTION

The present invention relates to a method for manufacturing one or more S-shaped bent edges on a heat-isolating protection metal component and especially applicable to a protection component for sealing. It belongs in the technical field of processing technology for manufacturing bent edges on the periphery of a heat-isolating protection metal component.

Heat-isolating protection metal components have been widely used in the modern industry. Owing to the inherent properties of metals, the construction of the heat-isolating protection metal component is of high intensity and good shockproof ability and can be weatherproof. It also has the advantages of being convenient to install and replace, durable for use and so on. However, developing an effective connecting method is the crux of manufacturing a heat-isolating protection metal component. The product quality and cost advantage of such products is usually discounted due to improper connection technology, for example, using specialized machines and apparatuses to manufacture such products has the limitations of high investment and long product development cycle, adopting methods such as by way of adhesives, welding or riveting and so forth to fix the products, it has the restrictions imposed by the temperature environment and the materials themselves.

Currently, it is common to use a mold for bending the edge to manufacture such heat-isolating protection component. However, either a U-shaped molding or a Z-shaped molding each has the defects of numerous manufacturing steps and high capital investment on the mold and so on. For instance, a U-shaped molding in the art generally requires three manufacturing steps to finish manufacturing a bent edge. The standard steps of such U-shaped molding are: Firstly, bend a right-angled edge which is perpendicular to the base; Secondly, bend the right-angled edge which is perpendicular to the base by approximately 45 degrees outward; Thirdly, bend the 45-degree-bent edge flatly to the base; and the edge bending is completed. For a Z-shaped molding in the art, it currently takes four or even more steps to finish the edge bending. Therefore, the crux to increase the manufacturing efficiency and reduce the manufacturing costs is to provide a connection method with higher efficiency and reducing manufacturing steps.

BRIEF SUMMARY OF THE INVENTION

In view of the aforesaid disadvantages now present in the prior art, the object of the present invention is to provide a method for manufacturing S-shaped bent edge on heat-isolating protection metal component which can reduce the manufacturing steps and apparatuses and which only requires two manufacturing steps to complete an S-shaped edge bending. It can also be adapted to fit different thickness and different number of layers of the metal plates and with the heat-isolating layer in between.

To attain this, the present invention adopts the following technical proposal:

A method for manufacturing S-shaped bent edge on heat-isolating protection metal component comprising the following steps:

Place in order an upper layer of metal base plate and a lower layer of metal base plate as well as a middle layer of heat-isolating materials in between according to the requirements of the outward appearance and dimension and the various layers of the product; fix the metal base plates with the heat-isolating materials by means known in the art; form J-shaped edges on the base plates by conventional stamping means, and the J-shaped edges of the base plates are perpendicular to the horizontal portion of the metal base plates; each of the J-shaped edges of the base plates has an outwardly bent curve with a crown and a curve end; by means of a stamping step performed by an upper mold M1 with a concave surface and a flat surface and a lower mold M2 with a flat surface, the concave surface of the mold M1 exerts lateral force onto the curve ends so that the J-shaped edges of the base plates inwardly bend towards the upper metal base plate; then during the process when the mold M1 continuous to press longitudinally downward, the horizontal flat surface of its edge pressing part exerts vertical force to the crowns so that the J-shaped edges compressed into a construction with S-shaped bent edges. The middle layer can be formed by thermal insulating materials such as ceramic fiber, glass fiber or graphite fiber, or alternatively it can be an air layer.

In comparison with the prior art, the present invention has the following advantages and effects: The S-shaped bent edge manufacturing only requires two stamping steps, thereby reducing the capital investment of labor force and molding equipment, reducing costs and increasing productivity. At the same time, the S-shaped bent edges manufactured by the subject method eliminate the folding of bent edges and separation of the layers and thereby ensuring the quality of the product.

Figure 1:
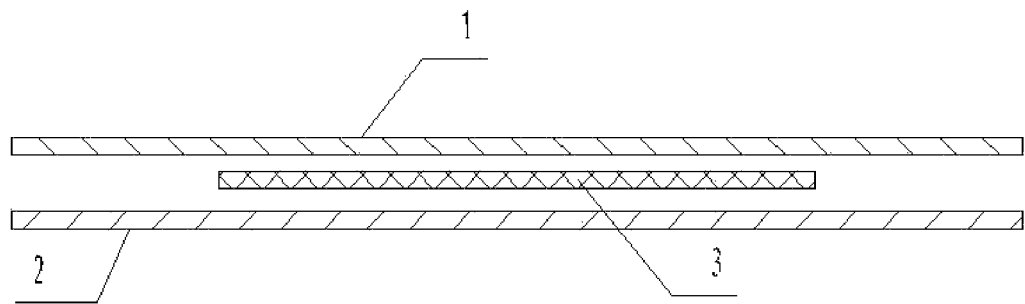
FIG. 1 shows the materials of various layers of the present invention being fixed together before manufacture.

In the drawings, 1 is upper metal base plate, 2 is lower metal base plates; 3 is heat-isolating material; 4 is edge of the base plate; 5 is crown; 6 is curve end; M1 is upper mold; M2 is lower mold.

DETAILED DESCRIPTION OF THE INVENTION

The preferred embodiments of the present invention are further described in detail with the following embodiment and the accompanying drawings.

FIG. 1 shows the materials of three layers of the present invention being fixed together before manufacture, wherein the metal base plates 1, 2 are cut into the same size according to the dimension requirements of the component, the middle layer is cut from a thermal insulating material 3 of low thermal transmissivity (which can be air, ceramic fiber, glass fiber or graphite fiber); the metal base plates 1, 2 and the cut heat-isolating material 3 are fixed together by means known in the art; inorganic adhesive can be used to ensure the security of the fixation.

Figure 2:
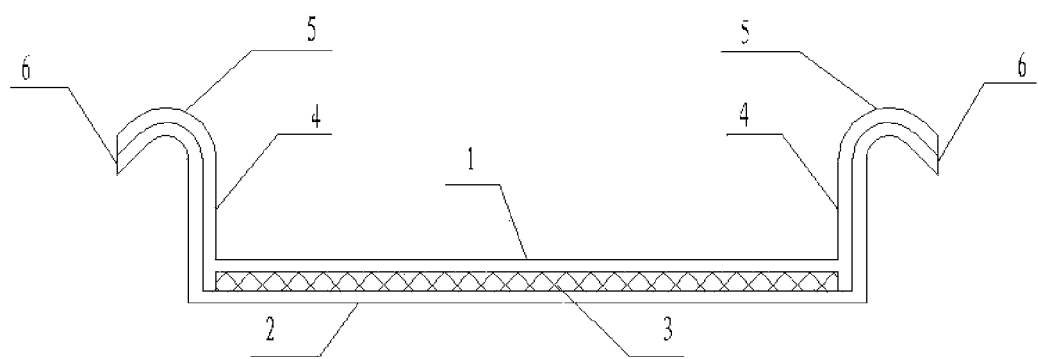
FIG. 2 is the cross-sectional view of the component showing the above materials after the first stamping.

As shown in FIG. 2, a component with J-shaped edge on the fixed plates is formed by the three layers of materials by conventional stamping equipment, the J-shaped edge is perpendicular to the horizontal base of the metal base plates 1, 2; namely, its shape is formed by a flat surface formed by the metal base plates 1, 2, a perpendicular base plate edge 4, a crown 5 and a curve end 6.

Figure 3:
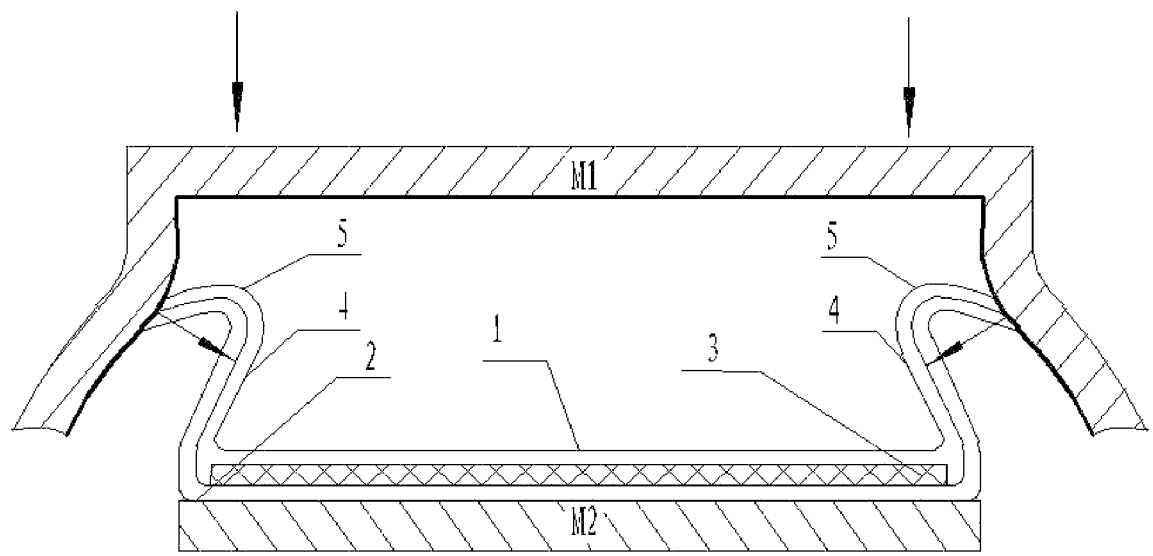
FIG. 3 shows the construction of the S-shaped bent edges of the component in FIG. 2 after the second stamping.

As shown in FIG. 3, an upper mold M1 is formed by a concave surface and a flat surface; a lower mold M2 is formed by a flat surface; during the process when the mold M1 presses downward longitudinally, the concave surface of the mold M1 exerts lateral force onto the curve end 6 so that of the base plate edge 4 inwardly bends towards the flat base of the metal base plates 1, 2.

Figure 4:
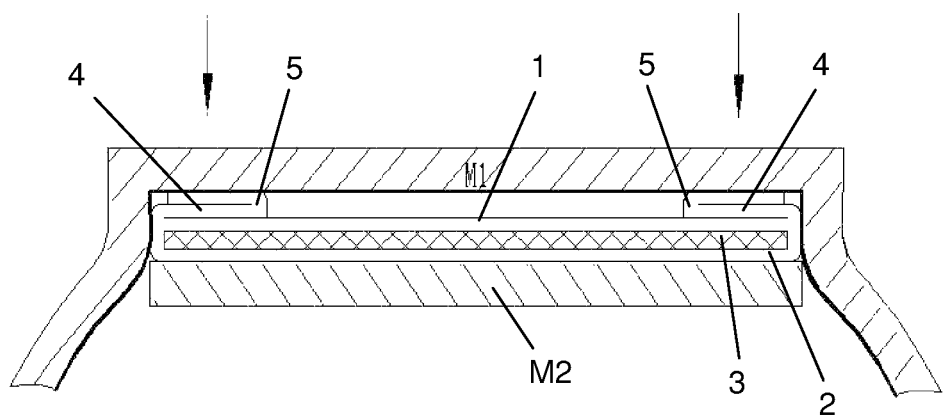
FIG. 4 shows the construction of the flat S-shaped bent edges of the component in FIG. 3 after the continuous second stamping.

As shown in FIG. 4, then during the process when the mold M1 continuous to press longitudinally downward, the horizontal flat surface of its edge pressing part exerts vertical force to the crown 5 so that the J-shaped edge 4 is compressed into a construction with an S-shaped bent edge parallel to the base plate by only one stamping.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A method of forming S-shaped folded edges on a heat-insulating protective metal component comprising the following steps:

placing a first metal base plate (1) to form an upper layer, a second metal base plate (2) to form a lower layer, and heat-insulating materials (3) in between the upper layer and the lower layer to form a middle layer; and then fixing the first and the second metal base plates (1, 2) with the heat-insulating materials (3);

stamping the first and the second metal base plates (1, 2) to form J-shaped edges (4), where the J-shaped edges (4) of the first and the second metal base plates (1, 2) are perpendicular to a horizontal portion of the first and the second metal base plates (1,2) and each of the J-shaped edges (4) has an outwardly bent curve with a crown (5) and an end (6);

using an upper mold (M1) which consists of a concave surface and a flat surface to press against a lower mold (M2) which consists of another flat surface to exert lateral force onto the ends (6) of the J-shaped edges (4) so that the J-shaped edges (4) of the first and the second metal base plates (1, 2) inwardly bend towards the first metal base plate (1) which forms the upper layer;

continuing in pressing the upper mold (M1) downward so that a horizontal flat surface of an edge pressing part of the flat surface of the upper mold (M1) exerts vertical force to the crowns (5) and compresses the J-shaped edges (4) into S-shaped bent folded edges.

2. The method of forming S-shaped folded edges on a heat-insulating protective metal component as in claim 1, wherein the middle layer of is an air layer or is formed by the heat-insulating materials (3) which consist of ceramic fiber, glass fiber or graphite fiber.

* * * * *